United States Patent
Mikkelsen et al.

(10) Patent No.: US 7,416,008 B2
(45) Date of Patent: Aug. 26, 2008

(54) AUTOMATIC WASTE-AREA REMOVAL APPARATUS

(75) Inventors: Steen B. Mikkelsen, Fontana, WI (US); Sergey Potebnya, Mequon, WI (US)

(73) Assignee: Mikkelsen Graphic Engineering, Inc., Lake Geneva, WI (US)

( * ) Notice: Subject to any disclaimer, the term of this patent is extended or adjusted under 35 U.S.C. 154(b) by 0 days.

(21) Appl. No.: 10/923,935

(22) Filed: Aug. 23, 2004

(65) Prior Publication Data
US 2005/0087306 A1  Apr. 28, 2005

Related U.S. Application Data

(60) Division of application No. 10/094,691, filed on Mar. 11, 2002, now Pat. No. 6,797,103, which is a continuation-in-part of application No. 09/804,344, filed on Mar. 12, 2001, now abandoned.

(51) Int. Cl.
  *B32B 38/10* (2006.01)
  *B32B 38/04* (2006.01)
  *B32B 3/10* (2006.01)

(52) U.S. Cl. .................. 156/356; 156/234; 156/247; 156/267; 156/261; 156/344; 156/517; 156/584; 428/47; 428/198

(58) Field of Classification Search .................. 156/344, 156/584, 234, 247, 267, 291, 356; 428/198, 428/47, 48
See application file for complete search history.

(56) References Cited

U.S. PATENT DOCUMENTS

| | | | |
|---|---|---|---|
| 282,920 A * | 8/1883 | Plimpton ...................... 229/80 |
| 3,785,898 A * | 1/1974 | Gerber et al. ................ 156/353 |
| 4,491,490 A * | 1/1985 | Ehret et al. .................... 156/64 |
| 4,512,839 A * | 4/1985 | Gerber ......................... 156/248 |
| 4,787,332 A * | 11/1988 | Geisel et al. ................. 118/692 |
| 4,836,139 A * | 6/1989 | Davies ......................... 118/696 |
| 4,945,593 A * | 8/1990 | Giebel et al. .................. 12/12.4 |
| 4,965,597 A * | 10/1990 | Ohigashi et al. ............ 347/118 |
| 5,695,600 A * | 12/1997 | Goin ........................... 156/584 |
| 6,106,645 A * | 8/2000 | Stempien ...................... 156/64 |
| 6,358,358 B1 * | 3/2002 | Bilisoly ....................... 156/344 |
| 6,772,661 B1 | 8/2004 | Mikkelsen |

* cited by examiner

*Primary Examiner*—Mark A Osele
(74) *Attorney, Agent, or Firm*—Jansson Shupe & Munger Ltd.

(57) ABSTRACT

An apparatus and laminate allow removal of at least one sub-area of a face layer sheet from a laminate composed of a backing layer with the face layer sheet adhering thereto to leave at least one product area of the face layer sheet in place on the backing layer. The apparatus may comprise a work surface for receiving the laminate thereon; at least one adhesive applicator mounted adjacent to the work surface; an actuator associated with the applicator(s); an actuator controller to cause application of an adhesive to predetermined portions of the waste area(s); a laminator beside the work surface including a supply of carrier web oriented for temporary lamination with the laminate using the applied adhesive; and a delaminator positioned to receive the carrier lamination and delaminate the laminate therefrom with the waste area(s) adhering to the carrier web.

24 Claims, 7 Drawing Sheets

AUTOMATIC WASTE-AREA REMOVAL APPARATUS

RELATED APPLICATION

This is a divisional of patent application Ser. No. 10/094,691, filed on Mar. 11, 2002 by Steen B. Mikkelsen, entitled "Automatic Waste-Area Removal Method," now U.S. Pat. No. 6,797,103, which was a continuation-in-part of now-abandoned patent application Ser. No. 09/804,344, filed on Mar. 12, 2001 by Steen B. Mikkelsen, entitled "Automatic Waste-Area Removal Method and Apparatus."

FIELD OF THE INVENTION

This invention is related generally to decal laminate technology, such as is involved in the preparation of one or more decals (e.g., "graphic areas" or "product areas") which are formed as part of a removable layer of a laminate for later removal and application onto various surfaces. More particularly, the invention relates to the field involving prior removal of waste portions of removable laminate layers, leaving the removable decal in place on the laminate.

BACKGROUND OF THE INVENTION

Many if not most decals are graphics-image-bearing portions (sometimes referred to herein as "product areas," whether or not they have graphics images thereon) of a removable layer (sometimes referred to herein as a "face layer") of a laminate. Each such decal laminate typically includes the face layer and a backing layer (or "liner"), the face layer being removably secured to the backing layer by an adhesive. The adhesive is preferential to the face layer, and is used, after removal of the product area(s) from the backing layer, for the adhesive attachment of the product area(s) of the face layer onto the surface intended to be covered—for decorative, signage or any of a multitude of other purposes.

To facilitate production of product areas (decals) in a form ready for use, it is frequently necessary or desirable to pre-remove the area or areas of the face layer which is/are not product areas from the backing layer of the decal laminate. (These non-product areas of the face layer are often referred to herein as "waste areas.") Such pre-removal of waste areas leaves the product area(s) on the backing layer—ready to be easily peeled away from the backing layer just prior to use. The pre-removal of waste areas of a face layer, sometimes referred to "sheet-weeding," greatly facilitates the subsequent removal of product areas (decals) just prior to use.

(The pre-removal of waste areas, of course, follows slitting or other severing of the product areas from the waste areas, which occurs while the removable layer to be slit or severed is in place on the backing layer. A highly preferred and advantageous method and apparatus for accurate severing around the product area or areas of the face layer of a decal laminate is disclosed in commonly-owned U.S. patent application Ser. No. 09/678,594, filed Oct. 4, 2000, entitled "Method and Apparatus for Precision Cutting and the Like of Graphics Areas from Sheets," now U.S. Pat. No. 6,772,661.)

Sheet-weeding is typically carried out by nimble-fingered workers who delicately lift and peel away unused portions of the image-bearing face layer of a decal laminate. This is tedious and time-consuming work. Progress has been made toward automating the sheet-weeding process; despite such efforts, there remains a need for an improved automatic waste-area removal method and apparatus.

Various automated systems have been devised over the years for facilitating sheet-weeding operations. Among these are the systems and concepts disclosed in the following United States patents: U.S. Pat. No. 5,143,576 (Logan); U.S. Pat. No. 5,277,736 (Logan); U.S. Pat. No. 5,026,584 (Logan); U.S. Pat. No. 4,246,058 (Reed); U.S. Pat. No. 4,786,537 (Sasaki); U.S. Pat. No. 5,695,600 (Goin); and U.S. Pat. No. 4,333,781 (Meulenberg). These prior systems each have certain disadvantages or problems, some of which are set forth below.

The computer-controlled systems of the Logan patents use complex adhesive materials including microspheres or microcapsules which, when broken by force application, release strong adhesive to allow an overlay sheet to engage and remove portions of a sheet. Such adhesives can be very expensive, and force-activation can be problematic and difficult in high-speed operations.

The Reed disclosure involves an embossing of areas to be removed in order to weaken their adhesive attachment to the base layer and facilitate removal. However, such embossing tends to be a step which, among other things, may be unacceptable for removal of intricate waste areas or patterns around irregularly shaped decals or product areas.

The Sasaki disclosure involves removal of an overlayer after a separation is caused by radiation treatment of a radiation-responsive composition. This system is complex and believed not to be suitable for many high-speed production operations.

The prior systems and disclosures fall short of offering and delivering simple, effective sheet-weeding which is fully suitable for high-speed decal production and similar waste-area removal operations.

OBJECTS OF THE INVENTION

It is an object of this invention, in the field of decal laminate technology, to provide an improved sheet-weeding method and apparatus for prior removal of waste portions of removable laminate layers which overcomes some of the problems and shortcomings of the prior art.

Another object of this invention is to provide a sheet-weeder and sheet-weeding method which can operate at high speeds.

Another object is to provide a sheet-weeder which can operate with little or no detrimental effects to the product areas remaining on the laminate.

Another object of the invention is to provide a sheet-weeding method which more reliably removes all or nearly all of the waste areas of the face layer from the backing layer while more reliably not removing all or nearly all of the product areas.

Another object of the invention is to provide a sheet-weeding which allows reliable removal of waste areas of the face layer from the backing layer around delicate products areas.

Still another object of the invention is to provide a sheet-weeder which is simple, efficient and cost-effective.

Yet another object of the invention is to provide an improved method and apparatus for removal of select areas of less-than-all layers of a laminate which are useful in a wide variety of contexts and applications.

These and other objects of the invention will be apparent from the following descriptions and from the drawings.

SUMMARY OF THE INVENTION

The invention is a method and apparatus for removing waste area(s) of a face layer from a laminate composed of a backing layer with the face layer removably adhering thereto, while leaving at least one product area of the face layer in place on the backing layer. The sheet-weeding method of this invention includes applying an adhesive on portions of the waste area(s), temporarily adhering the laminate to a carrier surface (of a carrier-surface member) using the adhesive, and separating the laminate from the carrier surface with the waste area(s) remaining on the carrier surface.

A number of terms used herein are defined at the end of this "Summary" section. Such definitions should be referred to for clarity of understanding.

In certain highly preferred embodiments, the carrier-surface member is a carrier sheet—most preferably a carrier web. In such embodiments, the adhering step, in which the laminate is adhered to the carrier web or other carrier sheet, such combination is sometimes referred to herein as a "carrier lamination." In some embodiments, such carrier lamination is discarded with the waste area(s) remaining on it. Suitable carrier web materials include unused newsprint. Embodiments using a carrier web facilitate continuous or nearly continuous sheet-weeding.

In preferred embodiments of the invention utilizing a carrier web, the process of separating the laminate from the carrier web while leaving the waste areas on the carrier web involves peeling the carrier web away from the laminate. In certain preferred embodiments, it is most preferred that the separating step include the step of pulling the carrier web over a separator edge in tension to initiate separation of the laminate from the carrier web.

As already indicated, the carrier-surface member is preferably in the form of a carrier web; however, in some embodiments it can be in the form of a fairly large cylindrical roller—sufficient to accommodate various operations therearound. When in the form of a carrier web, the carrier web may be a long continuous two-ended web, such as the newsprint mentioned above, or may be an endless web each portion of which is used and reused. In preferred embodiments in which the carrier-surface member is either an endless carrier web or a large cylindrical roller, the method of this invention preferably includes, after the step of separating the laminate from the carrier surface with the waste areas thereon, the further step of removing the waste areas from the carrier surface and discarding the waste areas, thereby clearing the carrier surface for reuse.

In certain embodiments of the invention, the adhesive is applied adjacent to the product area(s), preferably only at discrete locations. It is preferred that the adhesive applicator apply a quick-drying liquid adhesive, doing so by shooting the adhesive onto the specific locations of the waste area(s) without applicator contact with the waste area(s).

Certain preferred embodiments in which a carrier web is used include: unrolling a portion of the carrier web from a roll; performing the laminating of a laminate to the unrolled portion of the carrier web; separating the laminate from the unrolled portion; and thereafter rolling up the carrier web with the waste area(s) thereon.

In preferred embodiments of this type, the web is moving in a direction along its length at least during the laminating and separating steps. In these embodiments, the product and waste area(s) each have at least one leading-edge portion and at least one trailing-edge portion (see definitions infra), some of the leading-edge portion(s) of the waste area(s) being adjacent to trailing-edge portions of the product areas. In highly preferred embodiments, the adhesive is applied to the leading-edge portion(s) of the waste areas.

In preferred embodiments, the precise locations of adhesive application are controlled by a computer. Precise locations are determined by what is best to affect separation of waste areas while leaving product areas fully intact on the backing layer.

The apparatus of this invention includes: a support for the laminate; an adhesive applicator adjacent to the supported laminate; an actuator associated with the applicator; a controller for the actuator to cause application of an adhesive to the waste area(s); a carrier-surface having a carrier surface positioned to receive the laminate with the laminate adhering thereto; and a separator adjacent to the carrier surface to separate the laminate from the carrier surface with the waste area(s) remaining on the carrier surface.

Certain embodiments of such apparatus also include a stripper for removing the waste area(s) from the carrier surface after the separation has been accomplished. This allows the carrier surface, which is preferably endless, to be reused, and in some cases enhances the continuous nature of the operation.

Certain preferred forms of the apparatus of this invention include: a work surface on which to receive the laminate; at least one adhesive applicator mounted adjacent to the work surface; an actuator associated with the applicator(s); an actuator controller to cause application of an adhesive to predetermined portions of the waste area(s); a laminator beside the work surface including a supply of carrier web oriented for temporary lamination with the laminate using the applied adhesive; and a delaminator positioned to receive the carrier lamination and delaminate the laminate therefrom with the waste area(s) adhering to the carrier web.

In certain other highly preferred embodiments of such apparatus, as already indicated by the above discussion of the inventive method, the carrier-surface member is a carrier web. In such embodiments, it is most preferred that the separator include a separator edge positioned so that the carrier web passes under tension over the edge to initiate separation of the laminate from the carrier web.

In highly preferred embodiments of the invention, the face layer of the laminate has a plurality of registration marks at and about the product area(s) which are used for locating those areas of the laminate to which adhesive is to be applied. More specifically, the apparatus includes a controller (e.g., computer) programmed with information on the product area(s) and the waste area(s) and a sensor mounted adjacent to the work surface and capable of sensing locations of the registration marks and transmitting such information to the controller. The applicator(s) is/are actuated in response to the information about the locations of the registration marks sensed by the sensor and the information on the product area(s) and the waste area(s).

The laminates for which the method and apparatus of this invention facilitate sheet-weeding operations can be in various forms. For example, the laminates can be in the form of discrete sheets, either large or small, or a laminate may be in the form of a lengthy continuous sheet (web) which extends from a supply roll to a take-up roll. Either way, the laminates to be weeded may have a large number of product areas on it, in a great variety of shapes and sizes, and a great number of waste areas in a variety of shapes and sizes. In other cases, a lengthy continuous laminate web may have one or more rows of identically-shaped product areas such as labels or the like.

Broadly considered, this invention is a method for removing sub-areas of a face layer from a laminate composed of a backing layer with the sub-areas removably adhering thereto over less than all of the backing layer, and the invention involves: applying an adhesive on portions of the sub-areas; temporarily adhering the laminate to a carrier sheet using the adhesive; and separating the sub-areas from the backing layer by peeling them off with the carrier sheet.

In certain preferred embodiments of the method of this invention, one waste area has a leading edge portion with a leading edge that includes a lead part and at least one trailing lateral part, and the separating step includes (1) separating the waste area (with the carrier surface, e.g., a carrier sheet in web or other form) from the backing layer along the lead part before the trailing lateral part(s) are separated from the backing layer, thereby creating a chord line spanning the lead part, (2) continuing the separating step until the chord line substantially spans the leading edge portion, and (3) thereafter completing the separating step.

In such embodiments, it is preferred that the leading edge portion have at least one starter tab along the lead part of the leading edge, the starter tab extending in the direction opposite the weeding direction and having a width less than about 10% of the width of the leading edge portion.

In a highly preferred embodiment, the leading edge is convex. Preferably, such convex leading edge is a substantially circular arc having a radius greater than half the width of the leading edge portion. Such arc can be very gentle; even if the radius is substantially greater than the width of the leading edge portion to the point that the arc is nearly a straight line, waste area removal is substantially facilitated.

In certain other preferred embodiments of the method of this invention, in which a product area has a delicate leading edge portion, the waste area includes one trailing edge portion adjacent to the delicate leading edge portion, such trailing edge portion having a force-modifying slit therein which surrounds the delicate leading edge portion and has ends on opposite sides thereof.

In certain preferred embodiments having delicate leading edge portions, the ends of the force-modifying slit are downstream of the delicate leading edge portion. Preferably, the force-modifying slit is arcuate; the slit may be substantially circular. It is highly preferred that the ends of the force-modifying slit be downstream of the delicate leading edge portion.

In certain embodiments of the inventive method, a particularly delicate product areas is surrounded by a temporary product area such that the temporary product area is removed from the backing layer at some time following the completion of the automatic weeding process.

In certain embodiments the apparatus for removing sub-areas of a face layer sheet from a laminate of the type having been formed by removably adhering the face layer sheet to a backing layer, the sub-areas covering less than all of the backing layer, the face layer sheet having a plurality of registration marks at and about the sub-areas, comprises a sensor that senses locations of the plurality of registration marks; an adhesive applicator that automatically applies adhesive to portions of the sub-areas in response to the sensor sensing locations of the plurality of registration marks; a carrier-surface member having a carrier surface that receives the laminate with the laminate adhering thereto via the adhesive; and a separator adjacent to the carrier surface that separates the laminate from the carrier surface with the waste area(s) remaining on the carrier surface.

In certain embodiments, the separator peels the sub-areas from the backing layer. In certain embodiments, the apparatus further comprises a controller that actuates the adhesive applicator to apply adhesive on portions of the sub-areas in response to the sensor sensing the locations of the plurality of registration marks.

In certain embodiments, the applicator is a jet applicator which applies adhesive without applicator contact with the sub-areas. In certain embodiments, the adhesive is a quick-drying liquid.

In certain embodiments, the carrier surface forms an endless web. In certain embodiments, at least one product area is surrounded by a sub-area, the product area remaining on the backing layer during separation of the sub-area and the backing layer.

In certain embodiments, the laminate formed by removably adhering a face layer sheet to a backing layer, the laminate for use with an apparatus for removing sub-areas of the face layer sheet from the backing layer, the sub-areas covering less than all of the backing layer, to leave at least one product area of the face layer sheet in place on the backing layer, the laminate comprising the backing layer; and the face layer sheet, the face layer sheet having a plurality of registration marks at and about the sub-areas, the face layer sheet including the sub-areas, each sub-area having a leading edge portion with a leading edge having a lead part, at least one trailing lateral part and at least one starter tab along the lead part, the starter tab extending in the direction opposite a weeding direction and having a width less than about 10% of the width of the leading edge portion. Such a laminate provides that, during removal of the sub-areas from the backing layer, the lead parts are separated from the backing layer before the trailing lateral parts are separated from the backing layer, thereby creating chord lines that span the lead parts before substantially spanning the leading edge portions with removal of the sub-areas progressing along the weeding direction.

In certain embodiments, each leading edge has two lateral parts, one on each side of the respective lead part. In certain embodiments, each leading edge is convex. In certain embodiments, each leading edge is a substantially circular arc having a radius greater than half the width of the respective leading edge portion. In certain embodiments, each radius is greater than the width of the respective leading edge portion.

The invention also includes, in combination, a laminate and an apparatus for use with the laminate, the laminate formed by removably adhering a face layer sheet to a backing layer, the face layer sheet having sub-areas covering less than all of the backing layer, the face layer sheet having a plurality of registration marks at and about the sub-areas, the apparatus removing the sub-areas of the face layer sheet from the laminate to leave at least one product area of the face layer sheet in place on the backing layer.

In such a combination, the apparatus may comprise a sensor that senses locations of the plurality of registration marks; an adhesive applicator that automatically applies adhesive to portions of the sub-areas in response to the sensor sensing locations of the plurality of registration marks; a carrier-surface member having a carrier surface that receives the laminate with the laminate adhering thereto via the adhesive; and a separator adjacent to the carrier surface that separates the laminate from the carrier surface with the waste area(s) remaining on the carrier surface.

In such a combination the laminate may comprise the backing layer; and the face layer sheet in which each sub-area has a leading edge portion with a leading edge having a lead part, at least one trailing lateral part and at least one starter tab along the lead part, the starter tab extending in the direction opposite a weeding direction and having a width less than about 10% of the width of the leading edge portion.

Such a combination provides that, during removal of the sub-areas from the backing layer, the lead parts are separated from the backing layer before the trailing lateral parts are separated from the backing layer, thereby creating chord lines that span the lead parts before substantially spanning the leading edge portions with removal of the sub-areas progressing along the weeding direction.

As used herein, the following terms have the meanings given below, unless the context requires otherwise:

The term "quick-drying adhesive" refers to a liquid adhesive which, when applied by the applicator, flows in its liquid state easily enough to be applied with a jet applicator or sprayer but which, when applied to the waste areas of the face layer, dries rapidly enough such that it acts properly as an adhesive when it is contacted by the carrier-surface member.

The term "weeding direction" as used herein refers to the direction in which the weeding progresses along a sheet or roll of materia. More specifically, it refers to the direction of motion of the line along which separation of waste areas from the backing layer occurs. Accordingly, the weeding direction proceeds from "upstream" positions to "downstream" positions.

The terms "leading edge portion" and "trailing edge portion" pertain, e.g., to portions of areas of the face layer (i.e., portions of the product areas/or portions of the waste areas) in embodiments of this invention in which the carrier surface (e.g., the surface of a carrier web) is moving during the adhering and separating (or "laminating" and "delaminating") steps of the sheet-weeding process. A leading edge portion of a waste area is a part thereof which is (1) immediately adjacent to and following a product area as determined along lines parallel to the weeding direction or (2) is immediately adjacent to a leading edge of the laminate if such leading edge is part of a waste area of the laminate. A trailing edge portion of a product area is a part of thereof which is immediately adjacent to and ahead of a waste area as determined along lines parallel to the weeding direction. In embodiments not involving a moving carrier web, the terms "leading edge portion" and "trailing edge portion" refer to the order of portions undergoing separation—with a "leading portion" always being encountered before a "trailing portion."

The term "leading edge" as used herein with respect to a waste area refers to the line along the farthest upstream boundary of the leading edge portion of such waste area.

The term "width" as used herein with respect to a waste area refers to a dimensional measurement taken across the waste area in a direction substantially perpendicular to the weeding direction.

The term "chord line" as used herein refers to the line along which separation of a waste area from the backing layer takes place, with the length of the chord line being equal to the length of the continuous portion of the waste area being separated from the backing layer. Thus, if the weeding process is occurring across a wide sheet of laminate, it is possible that there could be more than one "chord line" defined locally along the line of separation.

The term "force ratio" as used herein refers to the ratio of "adhering forces" to "pulling forces" on a portion of face layer. With respect to portions of a waste area which are to be separated from the backing layer, "adhering forces" include both (1) the holding force of the adhesive layer (between the face layer and the backing layer of the laminate material) and (2) any additional forces from the surrounding face layer (i.e., the force exerted on the portion of waste area by the surrounding product area from incomplete slitting of the face layer and/or the adhesive layer and/or from rejoining of portions of the adhesive layer on either side of the slit) which are holding the portion of the waste area in place, and "pulling forces" are adhesive forces between the waste areas and the carrier surface from the adhesive applied the waste areas. With respect to portions of a product area (not intended to be separated from backing layer), "adhering forces" are the force applied by the adhesive layer between the face layer and the backing layer of the laminate material, and "pulling forces" include both (1) the force exerted on the portion of the product area by the surrounding waste area being removed from around the portion of the product area (i.e., similar to the forces from surrounding waste area described above) and (2) any small forces which might occur from the contact of the carrier surface with the portion of the product area. (These force considerations are of course qualitative in nature and imply consistent bases of determination, whatever they may be—e.g., taking into consideration both normal forces and shear forces.)

The term "delicate leading edge portion" as used herein with respect to a product area refers to a portion of the product area for which the force ratio is approximately one or less than one and which has a dimension along the weeding direction. Thus, delicate leading edge portions of product areas are susceptible to unwanted separation from the backing layer unless the force ratio is raised. Examples of delicate leading edge portions of product areas include pointed leading edge portions such as the points of a star or small shapes such as letters.

The term "force-modifying slit" as used herein refers to cuts made in the trailing edge portion of a waste area adjacent to and surrounding a delicate leading edge portion of a product area to change the force ratio of the portion of the product area.

The term "starter tab" as used herein refers to small areas of waste area added to leading edge portions of waste area and extending in the upstream direction from the leading edge portion in order to change the force ratio of the leading edge portion of waste area, thereby enabling initiation of the separation of the waste area from the backing layer.

The term "particularly delicate product area" as used herein refers to entire product areas which are characterized by a low force ratio.

The term "temporary product area" as used herein refers to a small area of waste area which is not separated from around particularly delicate product areas and which are separated from the backing layer by hand after completion of the automatic weeding process.

BRIEF DESCRIPTION OF THE DRAWINGS

The drawings illustrate preferred embodiments which include the above-noted characteristics and features of the invention. The invention will be readily understood from the descriptions and drawings. In the drawings.

DETAILED DESCRIPTION OF PREFERRED EMBODIMENTS

Figure 1:
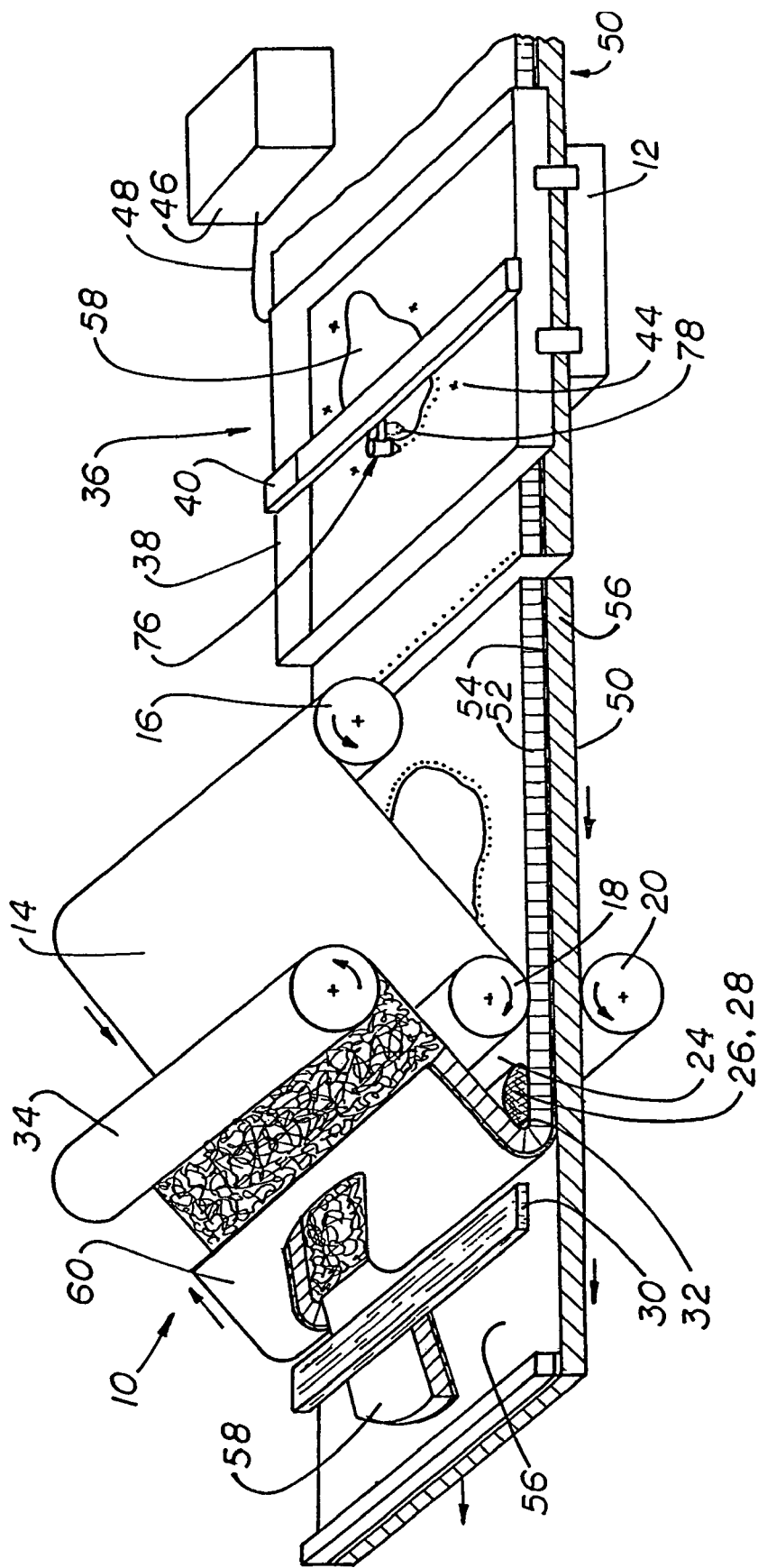
FIG. 1 is a highly schematic, fragmentary perspective view (not to scale) of an apparatus in accordance with this invention. In particular, the thicknesses of the laminate layers and carrier web are greatly exaggerated to help illustrate the principles of this invention.

Before describing sheet-weeding apparatus 10 and its various elements, which should be understood to be represented in highly schematic fashion, it will be helpful to describe the laminate upon which sheet-weeding apparatus 10 is operating and to illustrate some of the terms used to describe the sheet-weeder operation. Referring to FIG. 2, the laminate 50 a discrete sheet made up of multiple layers, including face layer 52, adhesive layer 54, and backing layer 56. FIGS. 1 and 3-7 also include illustrations of laminate sheet or sheets 50 with face layer 52, adhesive layer 54, and backing layer 56.

Referring again to FIG. 2, face layer 52 has been slit (severed), with the slit lines isolating product areas 58 from waste areas 60. Product areas 58 are shown in simple form; in many cases, the shapes of product areas may be very complex or intricate, and may have islands of waste areas within them. When waste areas 60 are weeded from laminate sheet 50, products areas 58 remain on backing layer 56 for their eventual intended use.

FIG. 2 further illustrates the leading and trailing edges of both product areas 58 and waste areas 60. If motion of laminate sheet 50 is assumed to be left to right as indicated in FIG. 2, then the location of a leading edge 68 of waste area 60 is as indicated. In similar fashion, a trailing edge 70 of a product area 58, a leading edge 64 of a product area 58, and a trailing edge 66 of a waste area 60 are indicated in FIG. 2.

FIG. 2 further illustrates discrete locations 62 of adhesive 72 applied to waste areas 60 of face layer 52. Adhesive 72 can be one of various quick-drying adhesives which are known in the art. Acceptable choices would be known to those skilled in the art and who are made aware of this invention. One group of adhesives which are useful are permanent waterborne acrylic pressure-sensitive adhesives available from ICI Americas Inc., New York, N.Y.

Figure 3:
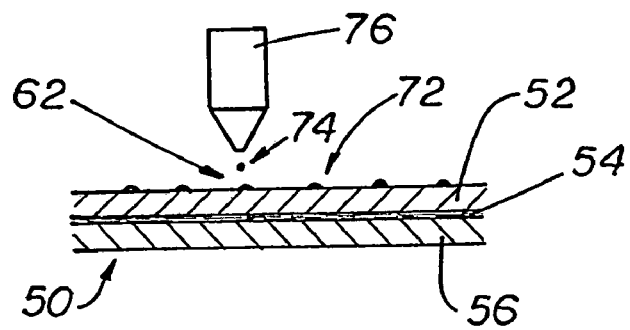
FIG. 3 is a schematic, side elevation of an adhesive applicator adjacent to a laminate (to be weeded) on a support surface. The laminate is again illustrated out of scale as to thickness.
Figure 4:
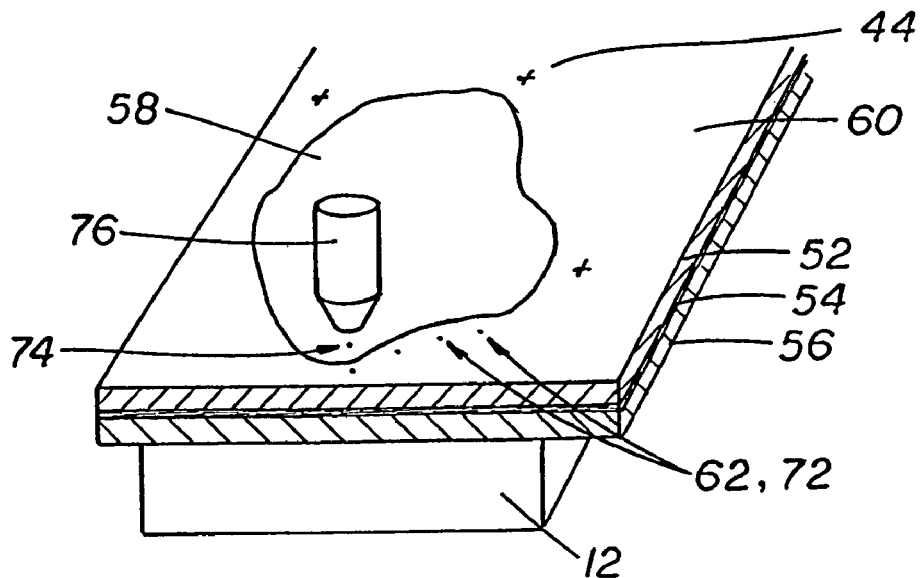
FIG. 4 is a schematic, fragmentary perspective view of FIG. 3. The laminate is again illustrated out of scale as to thickness.
Figure 6:
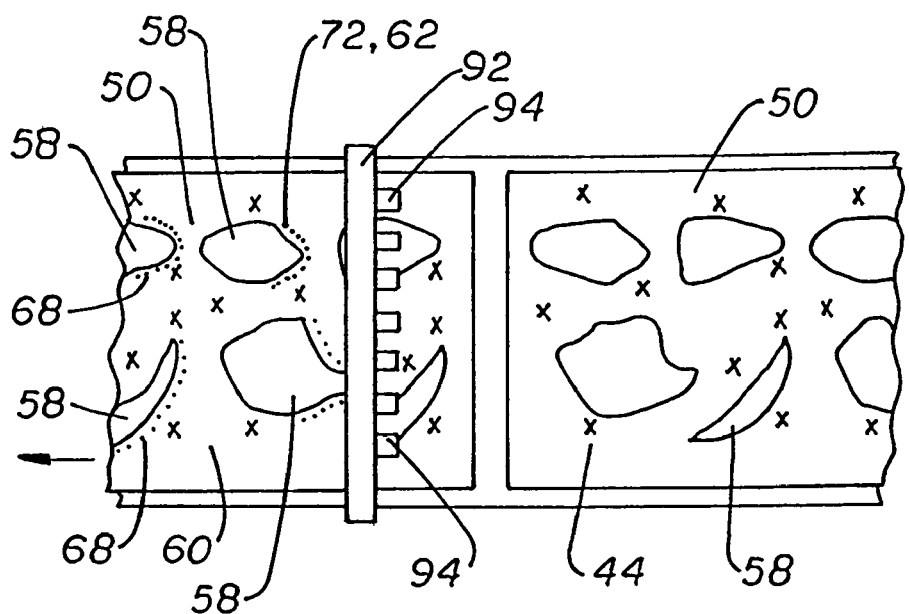
FIG. 6 is a schematic fragmentary plan view of the arrangement of parts of a sensing and adhesive applicator apparatus of a preferred embodiment of this invention, such sensing and applicator apparatus having multiple sensors and multiple jet applicators for adhesive.
Figure 7:
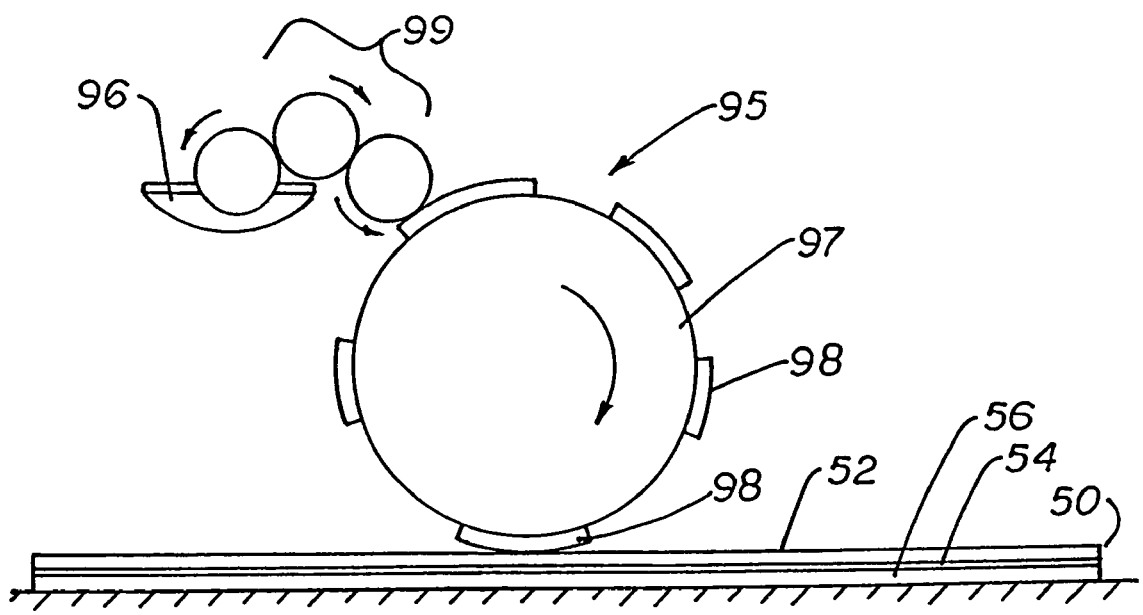
FIG. 7 is a schematic side elevation representing an alternative applicator apparatus for application of adhesive on intended portions of waste areas to be removed. Once again, the laminate is illustrated far out of scale as to thickness.

Referring to FIGS. 3 and 4, adhesive applicator 76 is positioned over discrete locations 62 on face layer 52 and applies adhesive 72 to discrete locations 62. As shown in FIGS. 3 and 4, adhesive applicator 76 does not make contact with face layer 52 of laminate sheet 50, but applies adhesive 72 by rapidly and accurately shooting small quantities of adhesive 72 in the form of droplets or spray 74. Applicators suitable for use as adhesive applicator 76, such as a jet or sprayer, are known in the art. FIG. 4 further illustrates a work surface 12 adjacent to applicator 76 for receiving laminate sheets 50. FIGS. 6 and 7, described further below, illustrate alternative devices for adhesive application.

Figure 2:
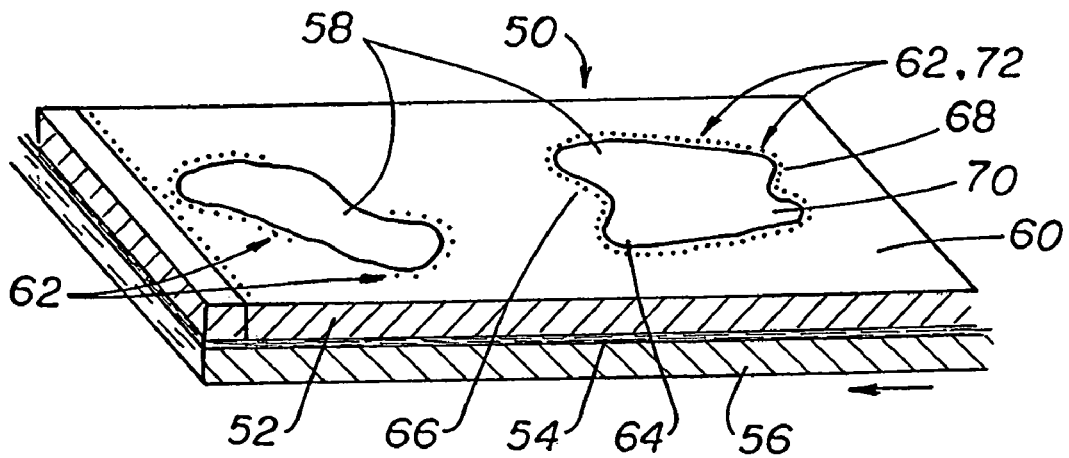
FIG. 2 is a schematic, fragmentary perspective view of a laminate, including product areas and a surrounding waste area, such laminate again being illustrated out of scale as to thickness.

Referring now to FIG. 1, which illustrates a much larger portion of inventive sheet-weeding apparatus 10, the embodiment shown is of the type which incorporates a carrier-surface member in the form of a carrier web 14 and in which carrier web 14 is moving in apparatus 10 in a direction along its length.

In FIG. 1, laminate sheets 50 and carrier web 14 are moving from right to left through apparatus 10. As a laminate sheet 50 moves from right to left, laminate sheet 50 is at first received and supported by support by work surface 12. Adhesive applicator 76 is mounted adjacent to work surface 12 on an actuator apparatus 36. Actuator apparatus 36 includes an actuator frame 38 and an actuator bar 40, and is configured and arranged such that adhesive applicator 76 can be moved back and forth along actuator bar 40 and actuator bar 40 can be moved back and forth along actuator frame 38, all under computer control as referred to below. In this way, any point on face layer 52 is available to receive adhesive 72. It should be noted that a plurality of applicators can be associated with one or more actuator apparatuses.

Still referring to FIG. 1, a sensor 78 is also adjacent to work surface 12 and is mounted such that it can be moved back and forth along actuator bar 40 along with adhesive applicator 76. Sensor 78 is responsive to registration marks 44. Sensor 78, actuator apparatus 36, and applicator 76 are connected to controller 46 through controller cable 48. Controller 46 is a computer programmed with information on product areas 58 and waste areas 60 such that the position of product areas 58 and waste areas 60 on work surface 12 enable actuator 36 to respond to controller 46 to move applicator 76 to the desired locations on face layer 52 and apply the precise amount of adhesive 72 to face layer 52.

Carrier web 14 is unrolled from a carrier web supply roll 16 and temporarily laminated with laminate sheet 50 by passing through a laminator, which includes a face layer laminator roller 18 and a backing layer laminator roller 20. The temporary lamination formed by laminator rollers 18 and 20 is held together by applied adhesive 72, and is referred to as a carrier lamination 24. Carrier lamination 24 is in tension as carrier lamination 24 is received by a delaminator 26, which includes a separator edge 28 and a retaining bar 30. Separator edge 28 has a tightly-rounded leading edge 32 which is shaped such that waste areas 60 are lifted off backing layer 56 as carrier lamination 24 passes over leading edge 32. Retaining bar 30 of delaminator 26 is positioned such that product areas 58 are prevented from being lifted up as carrier lamination 24 passes over separator edge 32.

After passing through delaminator 26, waste areas 60 remain adhered to carrier web 14 by adhesive 72, and product areas 58 remain on backing layer 56 for later use as intended. The weeded laminates are collected in a pile, ready for use.

Carrier web 14, with waste areas 60 remaining on it, is taken up by a carrier web take-up roller 34. When carrier web take-up roller 34 is full, it can be discarded and replaced with an empty roller. Carrier web 14 is preferably low-cost newsprint or the like.

As is by now apparent, FIG. 1 illustrates two laminate sheets 50, the first one (to the left in FIG. 1) undergoing separation after adhering to carrier web 14 and the second one (to the right in FIG. 1) having adhesive applied to its waste areas. It should be noted that, instead of being in the form of discrete sheets, the laminate could be in the form of a continuous laminate web. In such case, after weeding the weeded web, with its product areas ready for use, would itself be wound onto a take-up roller.

Referring again now to the second (the rightmost) laminate sheet shown in FIG. 1, such laminate sheet (like that before it) has a waste area along its leading edge and illustrates adhesive having been applied to a leading edge portion of such waste area. It should also be noted that, with respect to product area 58 as seen on the second laminate sheet in FIG. 1, adhesive is being applied all around the perimeter of product area 50. With respect to adhesive application at portions of waste areas around product areas, FIG. 6, discussed more below, serves to illustrate the application of adhesive only at leading portions of waste areas around product areas.

Figure 5:
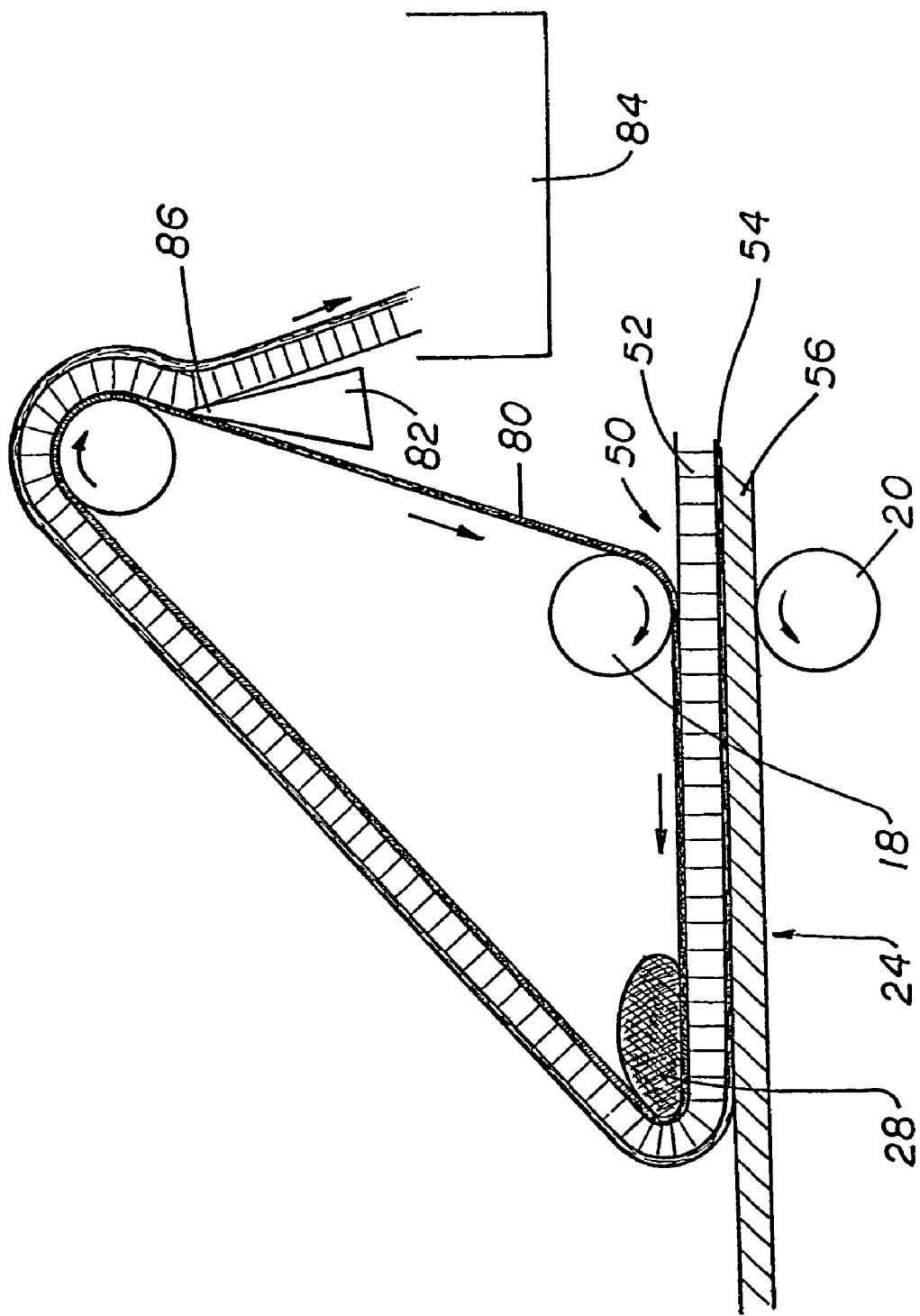
FIG. 5 is a schematic side elevation of an endless carrier web and its associated separator edge and waste-area stripper. The laminate and carrier web are again illustrated out of scale as to thickness.

FIG. 5 illustrates schematically a portion of another sheet-weeder apparatus 90 incorporating a carrier-surface member 80 which is in the form of an endless carrier web. Apparatus 90 also includes a separator edge 28 and a stripper 82. In similar fashion to apparatus 10 of FIG. 1, laminate sheet 50 and endless carrier web 80 move between a face layer laminator roller 18 and a backing layer laminator roller 20 to form a temporary carrier lamination 24.

Also in similar fashion to apparatus 10 of FIG. 1, separator edge 28 of apparatus 90 facilitates the lifting of waste areas 60 from backing layer 56, leaving product areas 58 on backing layer 56 for later use as intended, while waste areas 60 remain adhered to endless carrier web 80. Unlike apparatus 10 of FIG. 1, however, waste areas 60 which remain on endless carrier web 80 are removed from endless carrier web 80 by stripper 82, immediately freeing that portion of endless carrier web 80 for reuse. Stripper 82 incorporates a knife edge 86 which scrapes waste areas 60 from endless carrier web 80 and discards them into a waste bin 84.

Alternative strippers can include apparatus which applies heat (or removes heat, i.e., makes cold) in order to soften (or harden) the adhesive and release, or at least facilitate release of, waste areas from the endless carrier web or other carrier-surface member. Depending on the particular location along the endless carrier web (or other carrier-surface member) and depending on the type of adhesive used, differing temperature levels may be used to accomplish the adhering or releasing of laminate layers. Alternatives for the waste bin can include, e.g., a take-up roller to collect continuous waste areas removed from the endless carrier web by the stripper or a chopper and a conveyor to discard large amounts of waste material.

Precise application of adhesive to waste areas for sheet-weeding purposes depends on accurate information about the locations of product areas and waste areas. There are numerous ways in which such locations can be determined. Highly preferred ways involve the sensing of registration marks 44. For example, sensors can be in a line as is common in a computer scanner and either be fixed to a frame or free to move. Another alternative is that sensor 78 and applicator 76 can be moved independently to speed up operation of apparatus 10.

Referring now to the actuator apparatus with which one or more adhesive applicators are associated (for its/their control), the actuator apparatus can be designed to move the applicator(s) (and/or sensors) along three axes (rather just the two illustrated in FIG. 1) to give added flexibility and capability to the sheet-weeding apparatus.

Referring to the pattern of adhesive application, adhesive may be applied in discrete locations as illustrated, or can be applied in line segments, continuous lines, or even in wide areas as appropriate to the particular sheet-weeding application. This can include the entire surface of the waste area or areas. One preferred pattern, as illustrated by the rightmost product area of FIG. 2, involves application of adhesive on waste areas just beyond all of the edges of the product areas. Another pattern can be continuous lines along the length of the laminate—e.g., to remove waste areas along the edges of the laminate, such as in the production of pressure-sensitive labels.

FIG. 6 illustrates schematically a highly preferred location sensing and adhesive-application apparatus 92 having several sensing and adhesive-applicator units 94 arranged side by side in a line across laminate. Sensing/applicator units 94 need not move in order to sense the locations of registration marks 44 or to apply adhesive in the proper locations on the two laminate sheets 50 that are shown in FIG. 6. Instead, based on their sensing and the rate of movement of laminate sheets 50, the adhesive applicators of sensing/applicator units 94 apply adhesive 72 at the proper time to be applied to discrete locations 62, which are the locations programmed to be appropriate to facilitate the later separating step. FIG. 6 also serves to illustrate the preferred application of adhesive on various selected leading edge portions 68 of the waste areas 60 of two discrete laminate sheets 50, as the laminate sheets pass sensing and adhesive-application apparatus 92.

FIG. 7 illustrates another alternative adhesive-application apparatus 95, in this case an applicator which applies adhesive by direct contact with face layer 52 of laminate sheet 50. Adhesive application apparatus 95 applies adhesive 96 by means of an applicator roller 97 that has contact members 98 positioned to engage face layer 52 at the intended portions of its waste areas. Contact members 98 of applicator roller 97 receive adhesive 96 via transfer rollers 99, and deposit such adhesive upon contact with face layer 52. A variety of other adhesive applicator devices can be used in the apparatus of this invention.

Figure 8A:
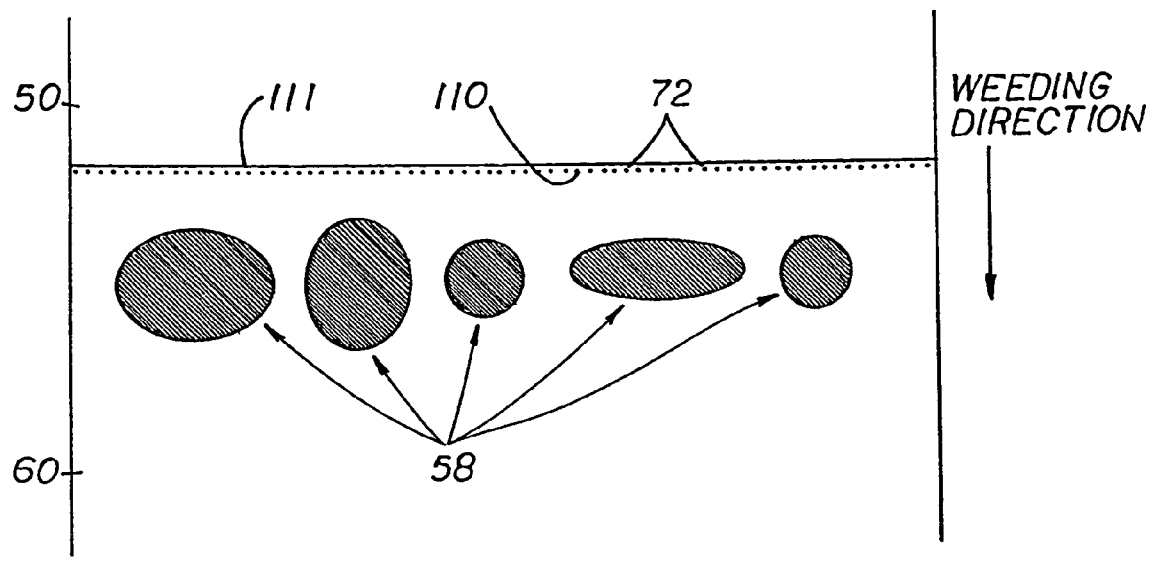
FIG. 8a is a top view of a portion of a sheet of laminate illustrating a waste area leading edge portion which is perpendicular to the weeding direction.
Figure 8B:
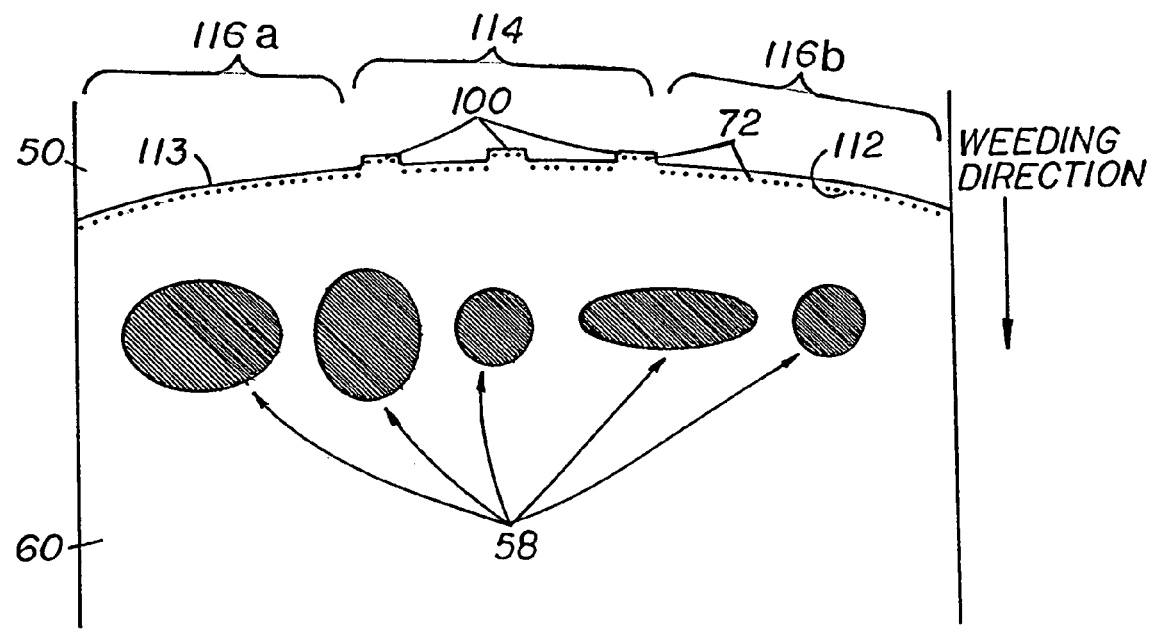
FIG. 8b is a top view of a portion of a sheet of laminate illustrating a preferred force-modifying feature included in a preferred shape of a waste area leading edge portion.

FIGS. 8*a* and 8*b* illustrate an additional aspect of the inventive method wherein the leading edge of a waste area 60 is configured to facilitate more efficient and reliable removal of waste area 60 from the backing layer of the laminate. Waste area 60 surrounds product areas 58. In FIG. 8*a*, a leading edge portion 110 of waste area 60 is substantially perpendicular to the weeding direction. As the separation process progresses along laminate sheet 50, the line of separation (not shown) reaches the leading edge 111 of leading edge portion 110, and a pulling force is applied to leading edge portion 110 through adhesive 72 (shown as deposited at a series of discrete locations across leading edge portion 110). Since leading edge 111 is perpendicular to the weeding direction, the total force required to cause separation suddenly increases as the line of separation reaches leading edge portion 110. Depending on a number of variables such as the nature of the various material surfaces and the adhesive strengths of adhesive 72 and the adhesive layer of the laminate, the force ratio may be too high, thus preventing leading edge portion 110 from separating cleanly from the backing layer.

FIG. 8*b* illustrates a preferred embodiment of the inventive method which lowers the force ratio, thereby enabling efficient and reliable separation of waste area from backing layer. The leading edge 113 of a leading edge portion 112 is given a slightly convex shape, thereby dividing leading edge 113 into a lead part 114 and two trailing lateral parts 116*a* and 116*b*. (The approximate width of parts 114, 116*a*, and 116*b* are indicated in FIG. 8*b* by the brackets drawn upstream of leading edge 113.) As the line of separation progresses along sheet 50, the line of separation reaches lead part 114 prior to reaching trailing lateral parts 116a and 116b. The length of the chord line across leading edge portion 112 gradually increases in length as the line of separation moves along sheet 50 in the weeding direction, thereby lowering the force ratio at the initiation of separation of waste area 60 and gradually raising the total force required to separate leading edge portion 112 from backing layer as the separation progresses.

FIG. 8b also illustrates a highly preferred embodiment of leading edge portion 112. Starter tabs 100 (three shown), extending in a substantially upstream direction from lead part 114, are added to leading edge portion 112 along lead part 114 of leading edge 113. Starter tabs 100 lower the force required to initiate separation as the line of separation encounters leading edge portion 113, thereby further increasing the efficiency and reliability of the separation process.

Figure 9:
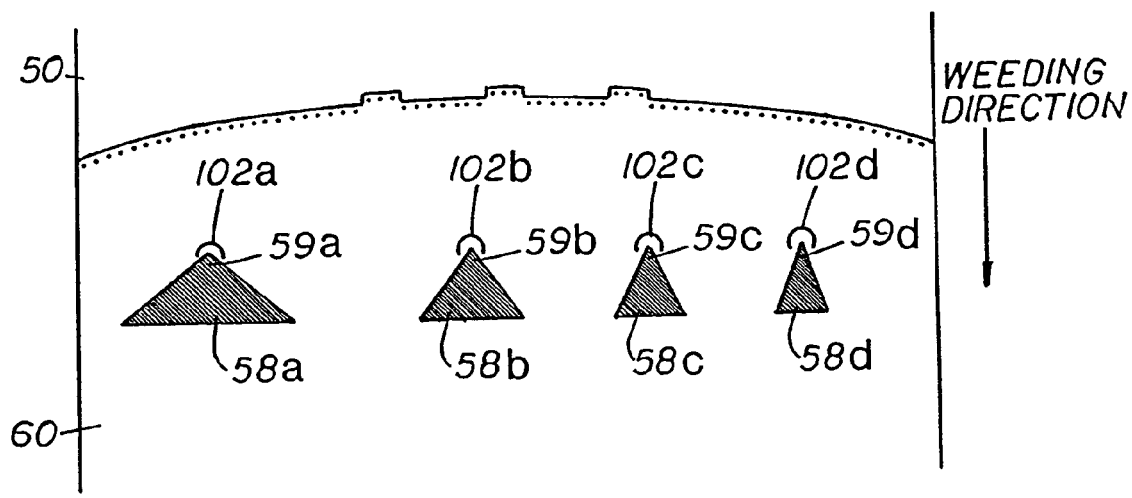
FIG. 9 is a top view of a portion of a sheet of laminate illustrating a force-modifying feature placed near a trailing edge portion of a waste area adjacent to a leading edge of a delicate feature of a product area.
Figure 10A:
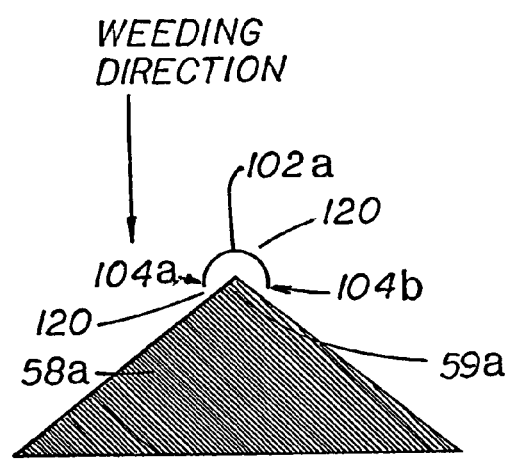
FIGS. 10a and 10b are enlarged portions of FIG. 9.
Figure 10B:
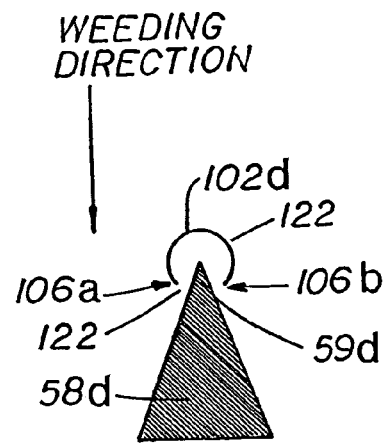

FIG. 9 illustrates another highly preferred embodiment of the inventive method. Sheet 50 is shown with waste area 60 and product areas 58a, 58b, 58c, and 58d, with each such product area having delicate leading edge portions 59a, 59b, 59c, and 59d respectively. Force-modifying slits 102a, 102b, 102c, and 102d surround delicate leading edge portions 59a, 59b, 59c, and 59d respectively. FIGS. 10a and 10b provide enlarged views of product areas 58a and 58d respectively. Trailing edge portions 120 and 122 are adjacent to delicate leading edge portions 59a and 59d respectively, with trailing edge portions 120 and 122 having force-modifying slits 102a and 102d respectively. (Trailing edge portions 120 and 122 are each shown with multiple indicators to illustrate that trailing edge portions 120 and 122 are areas of waste area which surround delicate leading edge portions 59a and 59d respectively.) In FIG. 10a, force-modifying slit 102a is positioned such that the end points 104a and 104b of slit 102a are on opposite sides of delicate leading edge portion 59a. As the line of separation progresses along sheet 50 in the weeding direction reaching the upstream portion of slit 102a at trailing edge portion 120, slit 102a allows trailing edge portion 120 to temporarily remain on the backing layer until the line of separation progresses to end points 104a and 104b. At this time, the force ratio for delicate leading edge portion 59a is high enough to cause separation of trailing edge portion 120 from the backing layer without causing delicate leading edge portion 59a to be separated from the backing layer.

FIG. 10b illustrates delicate leading edge portion 59d, having an even sharper point than delicate leading portion 59a. In similar fashion to events described in FIG. 10a, separation of delicate leading edge portion 59d is prevented. End points 106a and 106b of slit 102d are comparatively farther downstream than endpoints 104a and 104b, thus accommodating the increased sharpness of delicate leading edge portion 59d.

Figure 11:
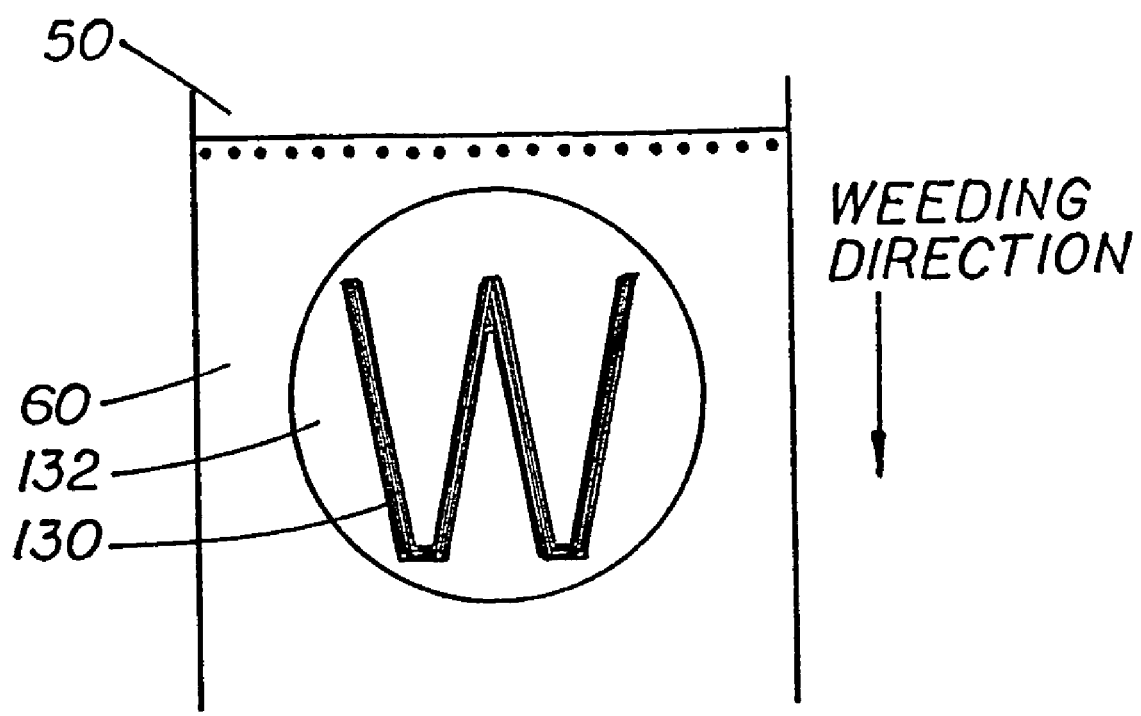
FIG. 11 is a top view of a particularly delicate product area surrounded by a temporary product area.

FIG. 11 illustrates another embodiment of the inventive method in which a temporary product area surrounds a particularly delicate product area. Sheet 50 is shown with waste area 60 surrounding a temporary product area 132 which surrounds a particularly delicate product area 130. In situations for which the force ratio for an entire product area is near or less than one, such as is illustrated by particularly delicate product area 130, temporary product area 132 is not separated from the backing layer by the automatic weeding process but is removed by manual weeding after the completion of the automatic weeding process. While the principles of this invention have been described in connection with specific embodiments, it should be understood clearly that these descriptions are made only by way of example and are not intended to limit the scope of the invention.

The invention claimed is:

1. Apparatus for removing at least one waste area of a face layer sheet from a laminate composed of a backing layer with the face layer sheet adhering thereto to leave at least one product area of the face layer sheet in place on the backing layer, comprising:
   a work surface for receiving the laminate thereon;
   a quick-drying liquid adhesive;
   at least one adhesive applicator mounted adjacent to the work surface;
   an actuator associated with the applicator(s);
   a programmed actuator controller to cause deposit of the quick-drying liquid adhesive from the applicator onto predetermined discrete locations of the waste area(s), such discrete locations covering only a minority of each waste area, the programmed controller responding to sensing of a group of marks on the laminate by a sensor;
   a laminator beside the work surface including an adhesive-free carrier surface oriented for temporary lamination to form a carrier lamination with the laminate using the applied adhesive; and
   a delaminator positioned to receive the carrier lamination and to delaminate the laminate from the carrier surface with the waste area(s) adhering to the carrier surface.

2. The apparatus of claim 1 wherein the delaminator includes a separator edge positioned for passage of the carrier lamination thereover in tension, thereby to initiate separation of the laminate from the carrier surface.

3. The apparatus of claim 1 wherein the at least one applicator is a jet applicator that applies liquid adhesive without applicator contact with the waste areas.

4. The apparatus of claim 1 wherein the product and waste area(s) each have at least one leading-edge portion and at least one trailing portion, some of the leading-edge portion(s) of the waste area(s) being adjacent to trailing-edge portions of the product areas, and wherein the controller is a computer programmed to apply adhesive to the leading-edge portion(s) of the waste areas.

5. The apparatus of claim 1 wherein:
   the group of marks is a plurality of registration marks on the face layer sheet of the laminate at and about the product area(s);
   the controller is a computer programmed with information on the product area(s) and the waste area(s); and
   the sensor is capable of sensing locations of the registration marks and transmitting such information to the computer, such sensor being mounted adjacent to the work surface,
whereby the at least one applicator is actuated in response to (a) locations of the registration marks sensed by the sensor and (b) information on the product area(s) and the waste area(s).

6. Apparatus for removing at least one waste area of a face layer sheet from a laminate composed of a backing layer with the face layer sheet adhering thereto, to leave at least one product area of the face layer sheet in place on the backing layer, comprising:
   a support for the laminate;
   an adhesive applicator adjacent to the supported laminate;
   an actuator associated with the applicator;
   a programmed controller for the actuator to cause deposit of an adhesive from the applicator onto discrete locations of the waste area(s), such discrete locations covering only a minority of each waste area, the programmed controller responding to sensing of a group of marks on the laminate by a sensor;
   a carrier-surface member having an adhesive-free carrier surface positioned to receive the laminate with the laminate adhering thereto; and a separator adjacent to the carrier surface to separate the laminate from the carrier surface with the waste area(s) remaining on the carrier surface.

7. The apparatus of claim 6 further comprising a stripper for removing the waste area(s) from the carrier surface.

8. The apparatus of claim 6 wherein the applicator is a jet applicator which applies liquid adhesive without applicator contact with the waste areas.

9. The apparatus of claim 6 wherein the carrier-surface member is a carrier sheet.

10. The apparatus of claim 9 wherein the carrier sheet is a carrier web.

11. The apparatus of claim 10 wherein the separator includes a separator edge positioned for passage of the carrier web thereover in tension, thereby to initiate separation of the laminate from the carrier web.

12. An apparatus for removing sub-areas of a face layer sheet from a laminate of the type having been formed by removably adhering the face layer sheet to a backing layer, the sub-areas covering less than all of the backing layer, the face layer sheet having a plurality of registration marks at and about the sub-areas, the apparatus comprising:
    a sensor that senses locations of a group of registration marks on the laminate itself;
    an adhesive applicator that automatically deposits adhesive from the applicator onto discrete locations of the sub-areas in response to the sensor sensing locations of the group of registration marks, such discrete locations covering only a minority of each waste area;
    a carrier-surface member having an adhesive-free carrier surface that receives the laminate with the laminate adhering thereto via the adhesive; and
    a separator adjacent to the carrier surface that separates the laminate from the carrier surface with the waste area(s) remaining on the carrier surface.

13. The apparatus of claim 12 wherein the separator peels the sub-areas from the backing layer.

14. The apparatus of claim 12 further comprising a controller that actuates the adhesive applicator to apply adhesive on portions of the sub-areas in response to the sensor sensing the locations of the plurality of registration marks.

15. The apparatus of claim 12 wherein the applicator is a jet applicator which applies adhesive without applicator contact with the sub-areas.

16. The apparatus of claim 12 wherein the adhesive is a quick-drying liquid.

17. The apparatus of claim 12 wherein the carrier surface forms an endless web.

18. The apparatus of claim 12 wherein at least one product area is surrounded by a sub-area, the product area remaining on the backing layer during separation of the sub-area and the backing layer.

19. A laminate formed by removably adhering a face layer sheet to a backing layer, the laminate for use with an apparatus for removing sub-areas of the face layer sheet from the backing layer, the sub-areas covering less than all of the backing layer, to leave at least one product area of the face layer sheet in place on the backing layer, the laminate comprising:
    the backing layer; and
    the face layer sheet, the face layer sheet having a plurality of registration marks at and about the sub-areas, the face layer sheet including the sub-areas, each sub-area having a leading edge portion with a leading edge having a lead part, at least one trailing lateral part and at least one starter tab along the lead part, the starter tab extending in the direction opposite a weeding direction and having a width less than about 10% of the width of the leading edge portion;
    whereby during removal of the sub-areas from the backing layer the lead parts are separated from the backing layer before the trailing lateral parts are separated from the backing layer, thereby creating chord lines that span the lead parts before substantially spanning the leading edge portions with removal of the sub-areas progressing along the weeding direction.

20. The laminate of claim 19 wherein each leading edge has two lateral parts, one on each side of the respective lead part.

21. The laminate of claim 20 wherein each leading edge is convex.

22. The laminate of claim 21 wherein each leading edge is a substantially circular arc having a radius greater than half the width of the respective leading edge portion.

23. The laminate of claim 22 wherein each radius is greater than the width of the respective leading edge portion.

24. In combination, a laminate and an apparatus for use with the laminate, the laminate formed by removably adhering a face layer sheet to a backing layer, the face layer sheet having sub-areas covering less than all of the backing layer, the face layer sheet having a plurality of registration marks at and about the sub-areas, the apparatus removing the sub-areas of the face layer sheet from the laminate to leave at least one product area of the face layer sheet in place on the backing layer, the apparatus comprising:
    a sensor that senses locations of the plurality of registration marks;
    an adhesive applicator that automatically applies adhesive to portions of the sub-areas in response to the sensor sensing locations of the plurality of registration marks;
    a carrier-surface member having a carrier surface that receives the laminate with the laminate adhering thereto via the adhesive; and
    a separator adjacent to the carrier surface that separates the laminate from the carrier surface with the waste area(s) remaining on the carrier surface; and
the laminate comprising:
    the backing layer; and
    the face layer sheet in which each sub-area has a leading edge portion with a leading edge having a lead part, at least one trailing lateral part and at least one starter tab along the lead part, the starter tab extending in the direction opposite a weeding direction and having a width less than about 10% of the width of the leading edge portion;
whereby during removal of the sub-areas from the backing layer the lead parts are separated from the backing layer before the trailing lateral parts are separated from the backing layer, thereby creating chord lines that span the lead parts before substantially spanning the leading edge portions with removal of the sub-areas progressing along the weeding direction.

* * * * *